(12) United States Patent
Beckmann et al.

(10) Patent No.: US 7,297,430 B2
(45) Date of Patent: Nov. 20, 2007

(54) ANODE DIFFUSION LAYER FOR A DIRECT OXIDATION FUEL CELL

(75) Inventors: Gerhard Beckmann, Altamont, NY (US); Xiaoming Ren, Menands, NY (US)

(73) Assignee: MTI MicroFuel Cells, Inc., Albany, NY (US)

( * ) Notice: Subject to any disclaimer, the term of this patent is extended or adjusted under 35 U.S.C. 154(b) by 706 days.

(21) Appl. No.: 10/262,167

(22) Filed: Oct. 1, 2002

(65) Prior Publication Data

US 2004/0062979 A1    Apr. 1, 2004

(51) Int. Cl.
*H01M 4/94*    (2006.01)
(52) U.S. Cl. .............................. 429/34; 429/42; 429/44; 429/36
(58) Field of Classification Search .................. 429/30, 429/34, 35, 36, 37, 38, 12, 13, 42, 44
See application file for complete search history.

(56) References Cited

U.S. PATENT DOCUMENTS

| | | |
|---|---|---|
| 4,046,956 A | 9/1977 | Fanciullo |
| 4,593,534 A | 6/1986 | Bloomfield |
| 4,673,624 A | 6/1987 | Hockaday |
| 4,810,597 A | 3/1989 | Kumagai et al. |
| 5,460,896 A | 10/1995 | Takada et al. |
| 5,523,177 A | 6/1996 | Kosek et al. |
| 5,573,866 A | 11/1996 | Van Dine et al. |
| 5,599,638 A | 2/1997 | Surampudi et al. |
| 5,631,099 A | 5/1997 | Hockaday |
| 5,723,228 A | 3/1998 | Okamoto |
| 5,759,712 A | 6/1998 | Hockaday |
| 5,766,786 A | 6/1998 | Fleck et al. |
| 5,773,162 A | 6/1998 | Surampudi et al. |
| 5,795,668 A | 8/1998 | Banerjee |
| 5,916,699 A | 6/1999 | Thomas et al. |

(Continued)

OTHER PUBLICATIONS

Ren, Xiaoming et al. Methanol Cross-Over in Direct Methanol Fuel Cells, Electronic and Electrochemical Materials and Devices, MST-11, MS-D429, Los Alamos National Laboratory, NM, pp. 284-293.

(Continued)

*Primary Examiner*—Patrick Joseph Ryan
*Assistant Examiner*—Monique Wills
(74) *Attorney, Agent, or Firm*—Cesari and McKenna LLP

(57) ABSTRACT

A fuel cell diffusion layer for delivering a fuel mixture to the anode face of a catalyzed membrane and for resisting flow of carbon dioxide produced in the anodic reaction back into the associated fuel chamber. The diffusion layer contains either conduits or channels on one aspect thereof to redirect the carbon dioxide generated at the anode in the fuel cell reaction away from the catalyzed membrane and away from the fuel chamber. This avoids the volume replacement by carbon dioxide of fuel mixture in the anode chamber and enhances the concentration of methanol that can be used in the fuel mixture. It also serves to allow only that fuel that is consumed in the reaction to enter the space between the anode face of the catalyzed membrane and the diffusion layer adjacent thereto. The diffusion layer further includes perforations to increase the ability to deliver fuel to the anode aspect of the membrane electrode assembly of the fuel cell. In accordance with another aspect of the invention, the perforations can comprise Nafion-filled capillaries.

13 Claims, 7 Drawing Sheets

U.S. PATENT DOCUMENTS

| | | |
|---|---|---|
| 5,925,476 A | 7/1999 | Kawatsu |
| 5,945,231 A | 8/1999 | Narayanan et al. |
| 5,992,008 A | 11/1999 | Kindler |
| 6,232,010 B1 | 5/2001 | Cisar et al. |
| 6,265,093 B1 | 7/2001 | Surampudi et al. |
| 6,296,964 B1 | 10/2001 | Ren et al. |
| 6,322,917 B1 | 11/2001 | Acker |
| 6,350,540 B1 | 2/2002 | Sugita et al. |
| 6,365,293 B1 * | 4/2002 | Isono et al. ............. 429/30 |
| 6,410,180 B1 | 6/2002 | Cisar et al. |
| 6,420,059 B1 | 7/2002 | Surampudi et al. |
| 6,689,502 B2 | 2/2004 | Choi |
| 6,797,422 B2 | 9/2004 | Fan et al. |
| 2001/0041282 A1 * | 11/2001 | Yamamoto et al. ......... 429/40 |
| 2002/0155341 A1 | 10/2002 | Finkehshtain et al. |
| 2002/0192537 A1 | 12/2002 | Ren |
| 2004/0062980 A1 | 4/2004 | Ren |

OTHER PUBLICATIONS

Narayanan, et al. "Electrochemical Characteristics of Carbon-Supported Pt, Pt-Sn, Pt-Ru Electrodes for the Oxidation of Methanol and Formaldehyde", From Fuel Cell Program and Abstracts, 1992 Fuel Cell Seminar, pp. 233-236 and 461-464.

Maynard et al. Miniaturized Fuel Cells for Portable Power, Presented at Conference on Small Fuel Cells and Battery Technologies 2000, New Orleans, LA, all pages.

Sharke, Paul. Pocket-Size PEMs, Http://www.memagazine.org/contents/current/features/pems/pems.html, Jul. 25, 2000, all pages.

Gottesfeld, et al. Polymer Electrolyte Fuel Cell as Potential Power Sources for Portable Electronic Devices, pp. 487-517.

* cited by examiner

ANODE DIFFUSION LAYER FOR A DIRECT OXIDATION FUEL CELL

BACKGROUND OF THE INVENTION

1. Field of the Invention

This invention relates generally to direct oxidation fuel cells, and more particularly to diffusion layers for such fuel cells.

2. Background Information

Fuel cells are devices in which an electrochemical reaction is used to generate electricity. A variety of materials may be suited for use as a fuel depending upon the materials chosen for the components of the cell. Organic materials, such as methanol or natural gas, are attractive fuel choices due to the their high specific energy.

Fuel cell systems may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing. Most currently available fuel cells are reformer-based fuel cell systems. However, because fuel processing is expensive and generally requires expensive components, which occupy significant volume, reformer based systems are presently limited to comparatively large, high power applications.

Direct oxidation fuel cell systems may be better suited for a number of applications in smaller mobile devices (e.g., mobile phones, handheld and laptop computers), as well as in some larger applications. In direct oxidation fuel cells of interest here, a carbonaceous liquid fuel (typically methanol or an aqueous methanol solution) is introduced to the anode face of a membrane electrode assembly (MEA).

One example of a direct oxidation fuel cell system is a direct methanol fuel cell system or DMFC system. In a DMFC system, a mixture comprised of predominantly of methanol or methanol and water is used as fuel (the "fuel mixture"), and oxygen, preferably from ambient air, is used as the oxidizing agent. The fundamental reactions are the anodic oxidation of the fuel mixture into $CO_2$, protons, and electrons; and the cathodic combination of protons, electrons and oxygen into water. The overall reaction may be limited by the failure of either of these reactions to proceed to completion at an acceptable rate (more specifically, slow oxidation of the fuel mixture will limit the cathodic generation of water, and vice versa).

Typical DMFC systems include a fuel source, fluid and effluent management systems, and air management systems, as well as a direct methanol fuel cell ("fuel cell"). The fuel cell typically consists of a housing, hardware for current collection and fuel and air distribution, and a membrane electrode assembly ("MEA") disposed within the housing.

The electricity generating reactions and the current collection in a direct oxidation fuel cell system generally take place within the MEA. In the fuel oxidation process at the anode, the products are protons, electrons and carbon dioxide. Protons (from hydrogen found in the fuel and water molecules involved in the anodic reaction) are separated from the electrons. The protons migrate through the membrane electrolyte, which is impermeable to the electrons. The electrons travel through an external circuit, which connects the load, and are united with the protons and oxygen molecules in the cathodic reaction, thus providing electrical power from the fuel cell.

A typical MEA includes a centrally disposed protonically-conductive, electronically non-conductive membrane ("PCM", sometimes also referred to herein as "the catalyzed membrane"). One example of a commercially available PCM is Nafion ® a registered trademark of E.I. Dupont Nemours and Company, a cation exchange membrane based on polyperflourosulfonic acid, in a variety of thicknesses and equivalent weights. The PCM is typically coated on each face with an electrocatalyst such as platinum, or platinum/ruthenium mixtures or alloy particles. On either face of the catalyst coated PCM, the electrode assembly typically includes a diffusion layer. The diffusion layer on the anode side is employed to evenly distribute the liquid fuel mixture across the catalyzed anode face of the PCM, while allowing the gaseous product of the reaction, typically carbon dioxide, to move away from the anode face of the PCM. In the case of the cathode side, a diffusion layer is used to allow a sufficient supply of and a more uniform distribution of gaseous oxygen across the cathode face of the PCM, while minimizing or eliminating the collection of liquid, typically water, on the cathode aspect of the PCM. Each of the anode and cathode diffusion layers also assist in the collection and conduction of electric current from the catalyzed PCM through the load.

Diffusion layers typically are fabricated of carbon paper or carbon cloth. In some cases, a diffusion layer may include a coating made of a mixture of high surface area carbon powder and polytetrafluoroethylene (such as Teflon ®, commercially available from E.I. DuPont Nemours and Company, generically referred to herein as "PTFE"). The PTFE component has a function of wet proofing the diffusion layer, but as the cell reaction proceeds, the carbon paper or carbon cloth can become saturated with the fuel mixture, water or other liquid. If this occurs, the ability of the anode diffusion layer to adequately deliver the fuel mixture to the catalyzed membrane, and evolve carbon dioxide from the active area of the anode is diminished, and the performance of the DMFC and DMFC system is compromised. As noted, the fundamental reaction that occurs at the anode aspect of a DMFC is the anodic disassociation of the fuel mixture into carbon dioxide, protons and electrons, which electrons produce the electricity generated by the fuel cell. When the fuel mixture is introduced to the anode catalyst, (typically disposed on or in proximity to the membrane electrolyte), gaseous carbon dioxide is formed. The carbon dioxide is a byproduct of the electricity generating anode reaction, and is removed to improve efficiency of the fuel cell and fuel cell system.

However, in direct oxidation fuel cells, this gaseous carbon dioxide typically travels away from the catalyzed surface of the PCM through the diffusion layer, and ultimately into the anode chamber, which contains the liquid fuel supply. This can prevent liquid fuel from passing through the diffusion layer and from being introduced to the anode aspect of the PCM. The carbon dioxide can also form a bubble, which impedes the mass transport of the fuel mixture to the anode diffusion layer and hence the catalyzed membrane electrolyte resulting in an insufficient amount of fuel being delivered to the catalyzed membrane electrolyte. Either of these occurrences may prevent fuel from being introduced to at least a portion of the catalyzed PCM, effectively reducing the size of the catalyzed PCM, and limiting the power output of the fuel cell and the fuel cell system.

In addition, anodically generated carbon dioxide can actually displace the volume of fuel that can be held in the anode chamber. This typically occurs when a volume of carbon dioxide coalesces on the surface of the anode diffusion layer on the aspect opposite the membrane electrolyte.

This volume displacement can further interfere with normal fluidic processes within the fuel cell system.

Further, as $CO_2$ passes through the fuel supply in the anode chamber, it comes in contact with the concentrated fuel in the fuel cell and carries out this high concentration fuel solution and water vapor away from the catalyzed membrane, further reducing the cell efficiency.

Some carbon dioxide buildup can be eliminated from the system using a gas-permeable material disposed generally parallel or in close proximity to the anode diffusion layer. In this manner, some $CO_2$ can be eliminated from the anode compartment and vented out of the system. A gas-permeable material has been described in commonly owned U.S. patent application Ser. No. 10/078,601 filed Feb. 19, 2002 for a SIMPLIFIED DIRECT OXIDATION FUEL CELL SYSTEM. Although the $CO_2$ is removed from the anode compartment using said a gas-permeable membrane, the $CO_2$ generated at the catalyzed membrane during the anodic reaction still travels through the tortuous path created by the structure of the diffusion layer and thus can still build up on the anode side prior to its reaching the liquid/gas phase separator, such as the gas-permeable membrane, or otherwise impede the flow of liquid fuel to the catalyzed anode surface of the membrane electrolyte. In addition, the $CO_2$ can form weak bonds with the high concentration methanol, and/or water vapor and may be difficult to separate without using a gas/liquid separator within the fuel cell. Other schemes and designs to facilitate the delivery of fuel to, and eliminate anodically generated effluent gasses from the fuel cell system typically employ pumps or other active fuel delivery or byproduct removal mechanisms to manage delivery of the fuel mixture to the catalyzed membrane, as well as to manage the removal of carbon dioxide. These mechanisms, however, can increase the complexity of the fuel cell system and can give rise to issues regarding orientation independence of the entire fuel cell system. More specifically, when such mass transport or active management components are needed, it may be preferable to maintain the fuel cell system in a certain orientation (relative to vertical) to more effectively deliver fuel to the catalyzed surface of the PCM, which may make application of a DMFC system difficult for certain mobile applications.

There remains a need therefore for a diffusion layer that eliminates a substantial portion of the anodically generated carbon dioxide (or other gaseous effluent) and which prevents the accumulation of said carbon dioxide (or other gaseous effluent) within the anode chamber of the fuel cell. There remains yet a further need for a means by which carbon dioxide can be removed from a fuel cell system, which does not increase the complexity of the fuel cell system and provides some measure of orientation independence.

It is thus an object of the invention to provide a diffusion layer that removes the $CO_2$ generated on the anode face of the catalyzed membrane, while effectively delivering fuel to the catalyzed membrane, and removing carbon dioxide from the anode side of the fuel cell prior to its reaching and passing through the anode diffusion layer.

SUMMARY OF THE INVENTION

The disadvantages of prior methods and apparatuses are overcome by the solutions provided herein. The present invention is a diffusion layer disposed in proximity to the anode electrode area to manage the delivery of the fuel mixture to the catalyzed membrane of the fuel cell, and to remove carbon dioxide from the fuel cell prior to its passing through the anode diffusion layer to the anode chamber, and into the fuel contained within the fuel cell system. The anode diffusion layer of the present invention includes a layer disposed adjacent to, and preferably in contact with, the anode aspect of the catalyzed membrane electrolyte. In accordance with one embodiment of the invention, the layer has perforations formed in it through which liquid fuel can travel towards the catalyzed membrane of the fuel cell. The layer further includes conduits or channels formed near or in the aspect of the diffusion layer that faces the catalyzed membrane of the membrane electrolyte. These conduits, or channels, provide preferential flow paths for carbon dioxide to be directed away from the catalyzed membrane and away from the anode chamber such that at least a portion of the carbon dioxide does not travel back through the diffusion layer into the anode chamber of the fuel cell.

In accordance with another aspect of the invention, the perforations formed in the diffusion layer are filled with a liquid permeable, gas impermeable substance that allows the fuel mixture to be introduced to the catalyzed membrane and the prevents carbon dioxide from passing through the anode diffusion layer and entering the fuel mixture contained within the anode chamber of the fuel cell.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
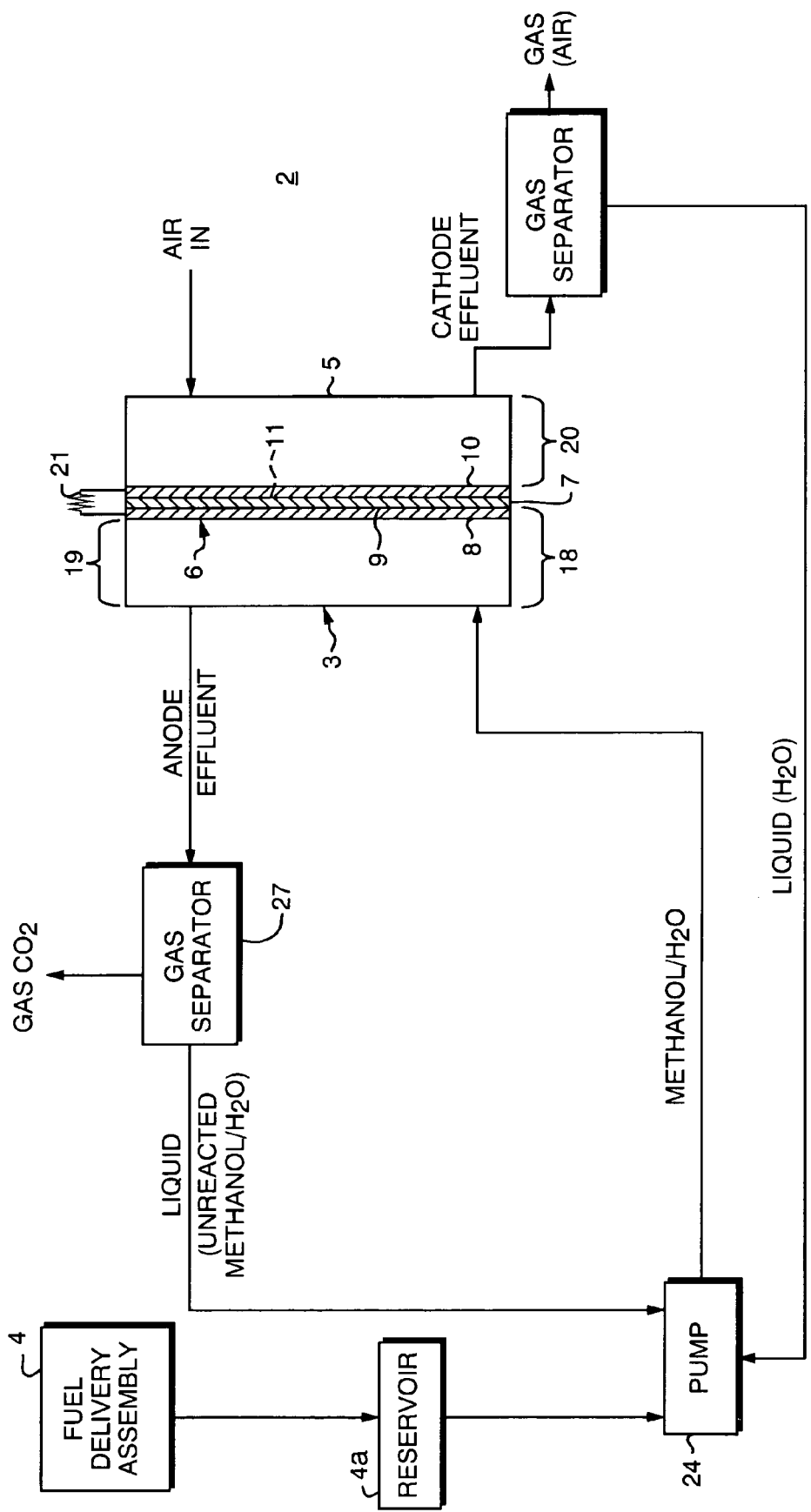
FIG. 1 is a block diagram of a direct oxidation fuel cell system with which the anode diffusion layer of the present invention may be employed.

For a better understanding of the invention, the components of a typical direct oxidation fuel cell system, a direct oxidation fuel cell and the basic operation of a direct oxidation fuel cell system, will be briefly described. One embodiment of a direct oxidation fuel system 2 is illustrated in FIG. 1, though the invention set forth herein may be used in other system architectures, and may enable an alternative fuel cell architecture described herein. The fuel cell system 2 is known in the prior art and includes a direct oxidation fuel cell, which may be a direct methanol fuel cell 3 ("DMFC"). For purposes of illustration we herein describe an illustrative embodiment of the invention with DMFC 3, and the fuel substance being substantially comprised of methanol or an aqueous methanol solution. It should be understood, however, that it is within the scope of the present invention that other fuels may be used in an appropriate fuel cell. Thus, as used herein, the word "fuel" shall include methanol and ethanol or combinations thereof and aqueous solutions thereof, and other carbonaceous substances amenable to use in direct oxidation fuel cell systems.

The system 2, including the DMFC 3, has a fuel delivery system to deliver fuel from fuel source 4. An internal reservoir 4a may, but need not be, utilized in conjunction with the fuel source. Alternatively, a refillable internal reservoir may be used to store fuel, and takes the place of internal reservoir 4a. The DMFC 3 includes a housing 5 that encloses a membrane electrode assembly 6 (MEA). MEA 6 incorporates protonically conductive, electronically non-conductive membrane (PCM) 7, MEA 6 also incorporates an anode diffusion layer 8 and cathode diffusion layer 10, each which serves to provide a means by which reactants can be introduced, and products of the electricity generating reactions can be removed from the reaction sites. A catalyst, including but not limited to platinum, a blend of platinum and ruthenium, or other alloy with high surface area particles, which may be supported or unsupported by carbon particles, is typically in contact with each of the PCM and each of the diffusion layers. The portion of DMFC 3, defined by the housing 5 and the anode face of the PCM, is referred to herein as the anode chamber 18. The portion of DMFC 3 defined by the housing 5 and the cathode face of the PCM is referred to herein as the cathode chamber 20. That portion of the anode chamber between the anode diffusion layer and the housing 5 shall be referred to herein as the fuel chamber 19. Each of the anode chamber and cathode chamber may contain a flow field plate to assist in the mass transport of the reactants, and/or a current collection apparatus or components to conduct current to the device being powered by the fuel cell system.

As will be understood by those skilled in the art, a carbonaceous fuel or aqueous solution thereof, from a fuel source 4, is introduced to anode diffusion layer 8 (possibly through an anode flow field plate, not shown) where it is dispersed and presented to the catalyzed anode aspect of the PCM 7, preferably in a substantially uniform fashion. Similarly, an oxidizing agent (or oxidant), preferably ambient air, is made available to the PCM 7, via the cathode diffusion layer 10, fabricated using materials and methods will known to those skilled in the art. Those skilled in the art will recognize that flow field plates (not shown) may be placed in contact with either or both of the diffusion layers 8,10 that are not in contact with the PCM 7. Collection of the current generated by the fuel cell is accomplished using methods known in the art.

Catalysts on the PCM 7 (or are otherwise present in each of the anode and cathode chambers, 18 and 20 respectively) enable the oxidation of the carbonaceous fuel and water mixture on the anode face 9 of the PCM 7 forming carbon dioxide as the byproduct of the anodic reaction, and releasing protons and electrons from the hydrogen atoms in the fuel and water mixture. Upon the closing of an external circuit, the protons pass through the PCM 7, which is impermeable to the electrons. The electrons travel through a load to provide the electrical power from the fuel cell 3. The electrochemical reactions are as follows:

Anode: $CH_3OH + H_2O = CO_2 + 6H^+ + 6e^-$  Equation 1

Cathode: $6H^+ + 6e^- + 3/2 O_2 = 3H_2O$  Equation 2

Net Process: $CH_3OH + 3/2 O_2 = CO_2 + 2H_2O$  Equation 3

As stated herein, the reaction which occurs on the anode aspect of the PCM 7 takes place at the anode aspect of the protonically conductive membrane. When the carbonaceous fuel mixture is introduced to the anode face of the PCM 7, carbon dioxide is formed as the byproduct of the anode reaction and protons and electrons are released from the hydrogen atoms present in the fuel mixture. The carbon dioxide passes through the anode diffusion layer into the fuel chamber 19 in a typical direct oxidation fuel cell. The volume of carbon dioxide can impede the introduction of fuel from the fuel chamber 19 through the anode diffusion layer to the anode aspect of the catalyzed membrane, and the volume of carbon dioxide can be great enough to displace fuel volume in the anode chamber if it is not provided a means by which it can be removed from the fuel cell, thus reducing the efficiency of the fuel cell.

Figure 2:
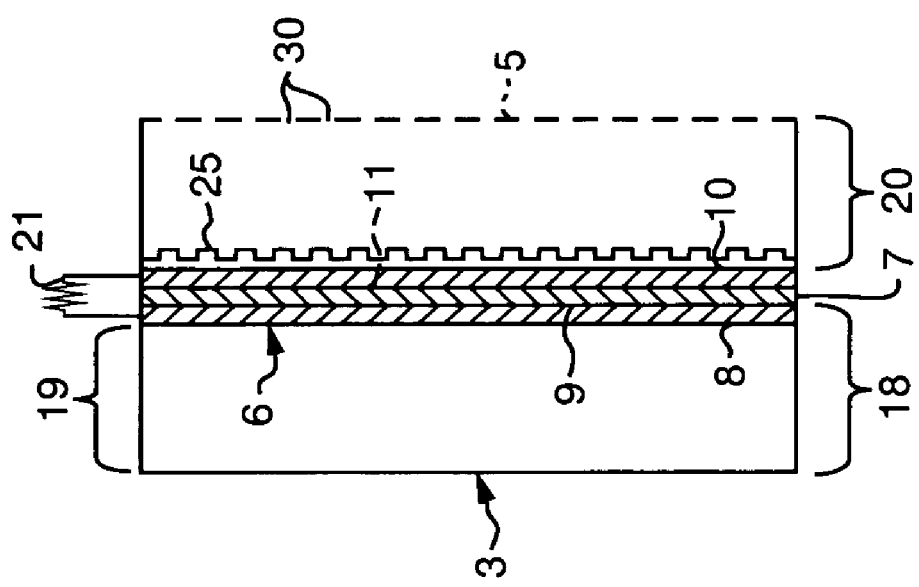
FIG. 2 is a schematic cross-section of a direct oxidation fuel cell including the anode diffusion layer of the present invention.

Referring now to FIG. 2, a fuel cell 3 of FIG. 1, including the anode diffusion layer of the present invention, which provides solutions to this problem, will be described in further detail. A protonically-conductive membrane PCM 7 has an anode face 9. The anode face 9 is coated with a catalyst layer. The catalyst layer is typically comprised of platinum and/or a blend of platinum and ruthenium or other alloys with high surface area particles. The fuel chamber 19 contains a carbonaceous fuel mixture, which may include water. The fuel mixture typically passes through the diffusion layer 8 and comes in contact with the catalyzed membrane (PCM) 7. There, is dissociates into carbon dioxide, electrons and protons. anodically generated carbon dioxide, then passes through anode diffusion layer back from the membrane and flows towards the fuel chamber 18. Because the fuel and the carbon dioxide are moving in different directions with respect to the membrane electrolyte, the removal of carbon dioxide and introduction of fuel can interfere with each other. Absent hydraulic pressure, the carbon dioxide may displace the fuel mixture in the fuel chamber.

On the cathode side, cathode diffusion layer 10 may be placed next to the cathode face 11 of the membrane 7. A flow field plate 25 may also be contained within the cathode chamber 20 to distribute the flow of oxygen that enters the fuel cell through the vents 30 in the cathode wall of the fuel cell housing, and the flow field plate 25 more evenly distributes the oxygen across the cathode face 11 of the membrane 7. The plate 25 may also serve as a current collector, which is connected to a similar device in the anode side (not shown) across which the load of the cell is connected for utilization of the electricity produced by the fuel cell.

Each of the anode diffusion layer 8 and cathode diffusion layer is preferably comprised primarily of a common porous electronically conducting material that does not react with the fuel mixture or otherwise interfere with the electricity generating reactions of the fuel cell. The material may be selected from the group consisting of a porous carbon composite material, or treated carbon paper or treated carbon cloth, or combinations thereof. It may be further possible to employ a plastic composite material or other polymer as the material used to form the diffusion layer. The diffusion layer is preferably less than several mils in thickness, and is, at least in part, gas impermeable and liquid permeable, such that it removes a substantial portion of the carbon dioxide.

As noted this minimizes or eliminates the demand on any gas-liquid separation that is to be performed within the anode chamber, and reduces the volume of carbon dioxide that enters the anode chamber.

Figure 3A:
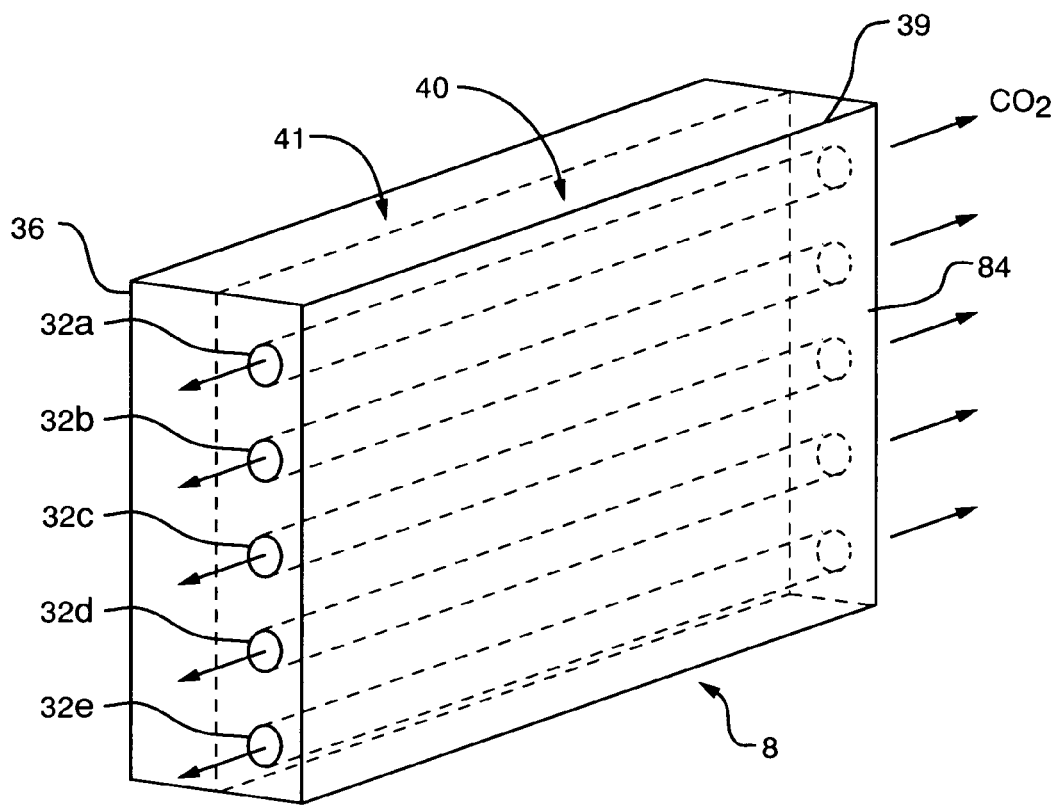
FIG. 3A is an isometric view of an anode diffusion layer that includes conduits for carbon dioxide removal from the anode chamber of the fuel cell.

The inventive diffusion layer 8 of FIG. 3A is a diffusion layer which contains conduit portions 32a through 32e, and can be implemented in the same fashion and construction as present diffusion layers, with the conduits being formed during the fabrication process or by drilling or otherwise formed using techniques that would be understood by those skilled in the art. The diffusion layer is preferably oriented such that the conduits are placed as close as possible to the anode aspect of the membrane electrolyte 7, though this is not necessary for the invention to provide benefit within the fuel cell system. The other aspect 36 of the diffusion layer 8 is adjacent to the fuel chamber 19, and provides a means by which fuel can enter the diffusion layer and be introduced to the anode aspect of the catalyzed membrane electrolyte 7.

Figure 3B:
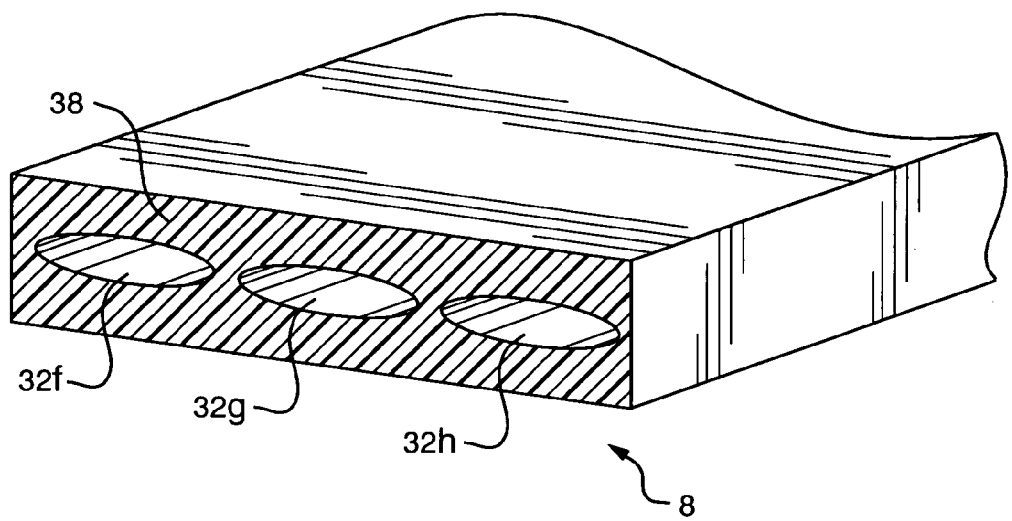
FIG. 3B is a top-plan view of another embodiment of the diffusion layer of the present invention shown in FIG. 3A.

FIG. 3B depicts a diffusion layer that is similar to the diffusion layer described in accordance with FIG. 3A, however, with a different conduit shape. In FIG. 3B, conduits 32f, 32g and 32h, are similar to those of FIG. 3A, but have an elliptical cross section to maximize the area into which carbon dioxide enters into said conduits. The conduits 32f through 32h also encourage gas transport so that carbon dioxide can be removed.

In accordance with this embodiment of the invention, the conduits are formed internally within the diffusion layer 8 such that the contact between the catalyzed membrane electrolyte 7 and the diffusion layer 8 is maintained as fully as possible in order to minimize contact resistance associated with the collection of electrons from the catalyzed face of the PCM. It is within the scope of the present invention, that the conduits may be other geometrical shapes and contours, including, but not limited to conical configurations, or may be branched. Regardless of their geometry, the conduits provide a path of less resistance by which the anodically generated carbon dioxide can escape from the fuel cell system, or be captured to perform work within the fuel cell system. It may be further preferable to form or treat the walls of the conduits in a manner that renders them hydrophobic in order to prevent fluids from being introduced to the carbon dioxide conduits. This may be accomplished by treating the conduit walls with PTFE or other hydrophobic materials, or by using other techniques known to those skilled in the art.

In either of FIG. 3A or 3B, conduits 32f-32h can be open or may be filled substantially with a gas permeable, liquid impermeable material, including for purposes of illustration and not by way of limitation, an expanded PTFE material to form a gas-permeable tube oriented along the axis of the diffusion layer 8 generally parallel to the MEA. Thus, the anode diffusion layer 8 described herein is selectively permeable to the carbonaceous fuel mixture, but impermeable to the carbon dioxide gas.

In another embodiment of the invention, a rigid porous material may be employed for the body of the diffusion layer 8, and the carbon dioxide ventilation conduits 32a-32e of FIG. 3A are formed or cast as openings within the anode diffusion layer 8. Other non-conductive porous materials may be used when a separate current collecting component is used to collect current from the anode electrode. An example of such a non-conducting material is MF Millipore mix cellulose ester membrane commercially available from the Millipore Corporation of Bedford, Mass. This typically has a mean pore size of about 8.0 μ and below.

This embodiment of the anode diffusion layer may also be formed as a multi-layered component including a first portion that is disposed generally adjacent the anode face of the catalyzed membrane, which is substantially comprised of a gas permeable material that allows carbon dioxide to travel back from said catalyzed membrane, into the conduits. Conduits 32a-e may be implemented, but are not necessary for the effective removal of carbon dioxide. In FIG. 3A, this portion is indicated as the portion 39, which between the phantom marking 40 and the diffusion layer that is in contact with the anode aspect of the catalyzed membrane electrolyte 34. The anode layer 8 may further include a second portion 41 aft of the conduits, that is substantially comprised of a gas impermeable, liquid permeable material whereby fuel can diffuse towards the catalyzed membrane 7, while carbon dioxide is encouraged to flow into the conduits, and away from the catalyzed membrane 7, and is prevented from flowing into the anode fuel chamber 19. The gas impermeable liquid permeable portion 41 of the anode diffusion layer 8 may be comprised of a separate structure, a membrane with the desired characteristics, or as a layer of a material that may be applied to the first portion 39, and allowed to cure.

Figure 4A:
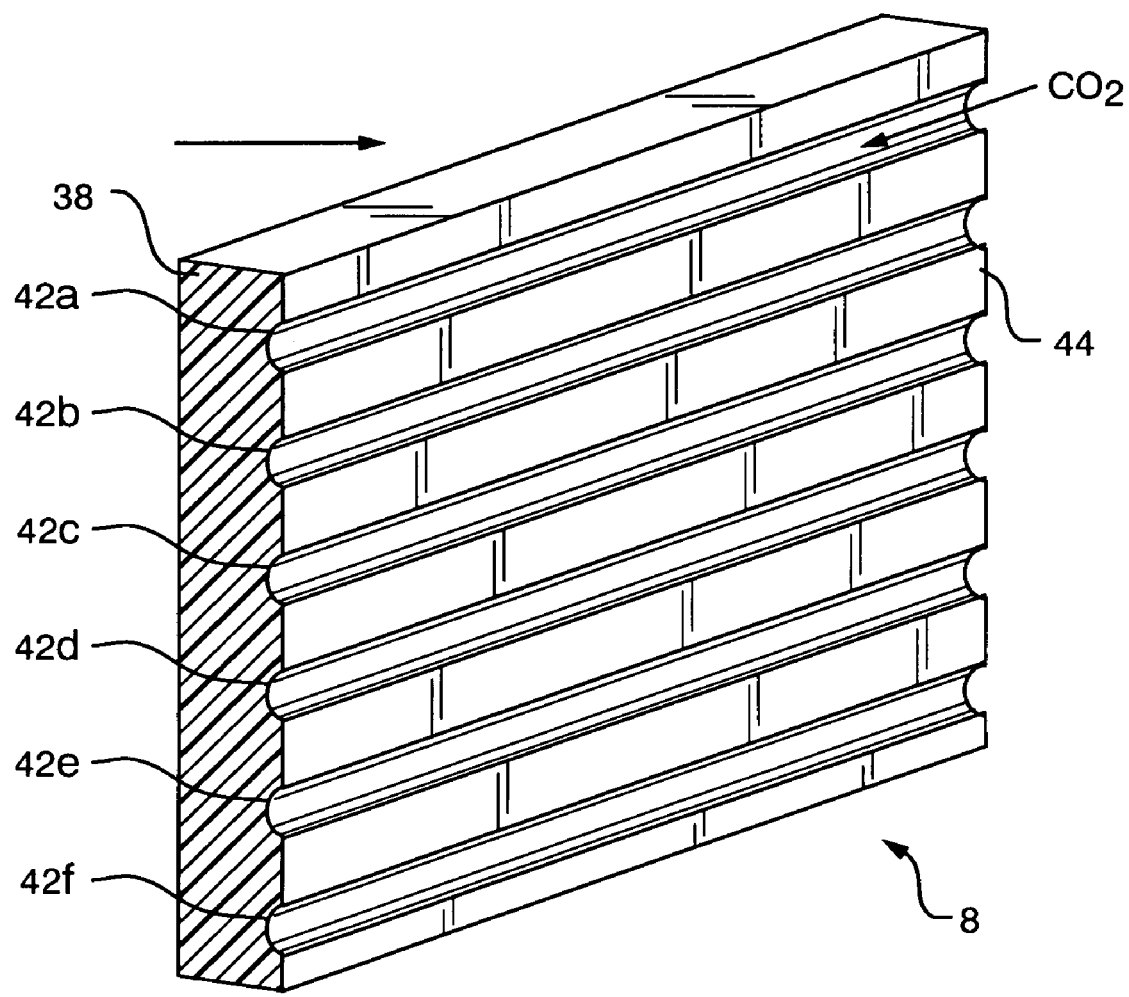
FIG. 4A is an isometric view of one embodiment of the anode diffusion layer of the present invention, which includes outer channels disposed on an exterior face of the diffusion layer of the present invention for carbon dioxide redirection and removal.

Another aspect of the invention is illustrated in FIG. 4A. In this embodiment of the invention, channels or indentations 42a-42f perform the function of carbon dioxide removal and redirection. The channels 42a-42f are formed in the face 44 of the anode diffusion layer 8 that is contiguous to the anode face 9 of the catalyzed PCM 7 (FIG. 2). This can be easily accomplished when a diffusion layer of typical materials and manufacture is used as a starting material for the layer 8. As previously noted, carbon dioxide generated as a byproduct of the anodic electricity generating reaction generally passes back towards the fuel chamber 19 through the diffusion layer 8. However, in the inventive diffusion layer illustrated in FIG. 4A, channels 42a-42f redirect at least a portion of the anodically generated carbon dioxide away from the anode aspect of the PCM 7, as indicated by the arrows on the channel 42b. The carbon dioxide is then vented out of the fuel cell in to the ambient environment, or it can be directed elsewhere in the cell system to perform mechanical work within the fuel cell system. This embodiment has the advantage of ease of manufacture, and removes the carbon dioxide while it is in very close proximity to the anode aspect of the PCM. Those skilled in the art will recognize that this embodiment can be fabricated by pressing or "embossing" channels into the diffusion layer, or by forming them in other commercial techniques. It is further, possible to fill the channels 42a-f with a material that provides a path of low resistance by which it can be removed. In the embodiment illustrated in FIG. 4A, electrical contact resistance may be increased, due to diminished contact between the diffusion layer 8 and the catalyzed anode face of the PCM.

In this embodiment of the invention, the body 38 of the diffusion layer 8, is preferably substantially gas-impermeable so that the carbon dioxide will not be permitted to permeate the body 38, but instead will be redirected via the channels away from the diffusion layer and thus the anode chamber 18.

Figure 4B:
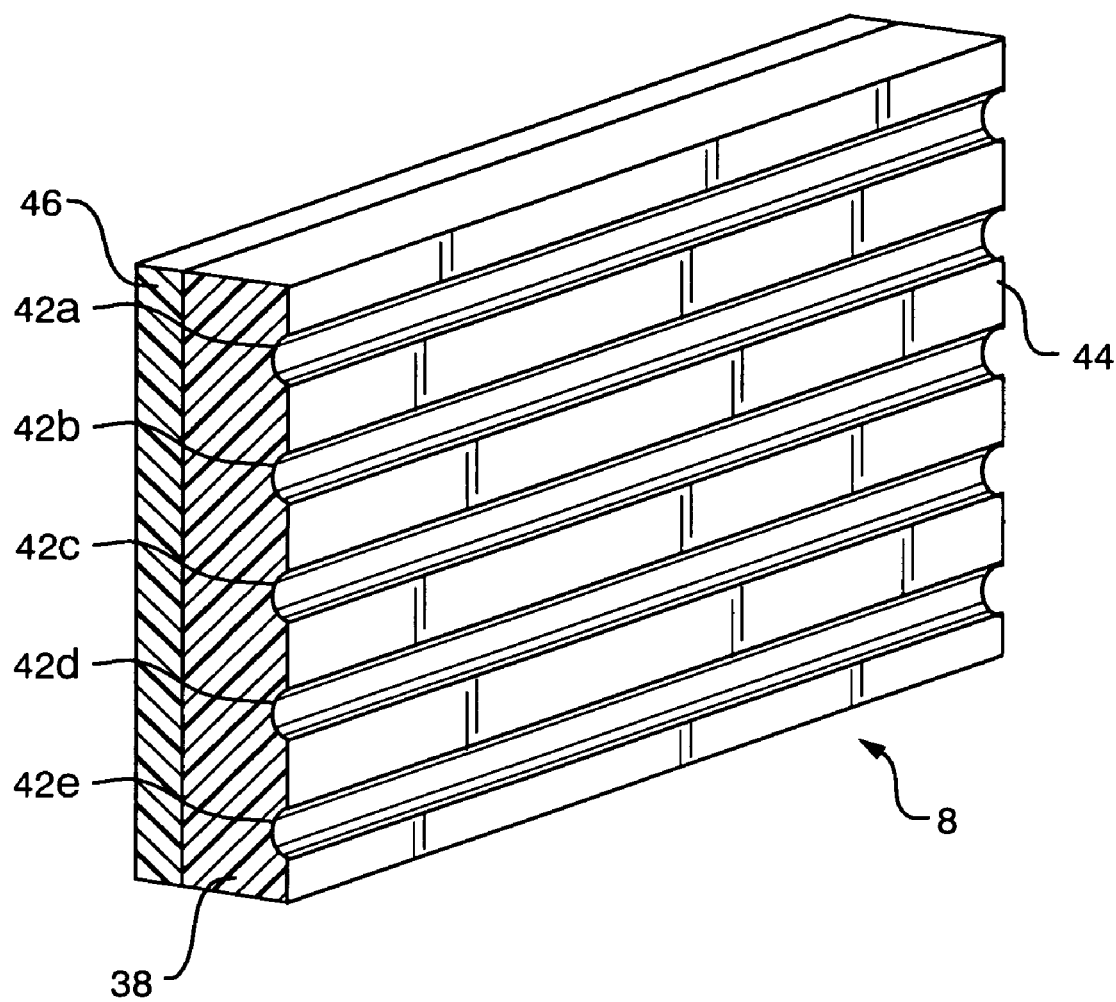
FIG. 4B is an isometric view of the embodiment of FIG. 4A, and which includes an additional layer.

Alternatively, it may be preferable to "seal" the anode diffusion layer 8 with a liquid permeable, gas impermeable layer which will allow the fuel mixture to by mechanically fastening, chemically bonding, or otherwise applying a suitable material to the diffusion layer in a manner that prevents anodically generated gasses from passing through the diffusion layer into the fuel chamber, while still allowing the liquid fuel to be introduced to the catalyzed anode face of the PCM. One way of doing this is shown in FIG. 4B, where a membrane 46 may be fastened or bonded to the diffusion layer 38. The membrane may be a Nafion membrane or any other membrane, which is permeable to the fuel mixture, but is gas impermeable. It may also be possible to obtain the desired effect by applying a material with the desired characteristics, such as a Nafion ionomer, to the anode diffusion layer and allow it to cure or dry, thus forming a liquid permeable, gas impermeable barrier layer.

Figure 5:
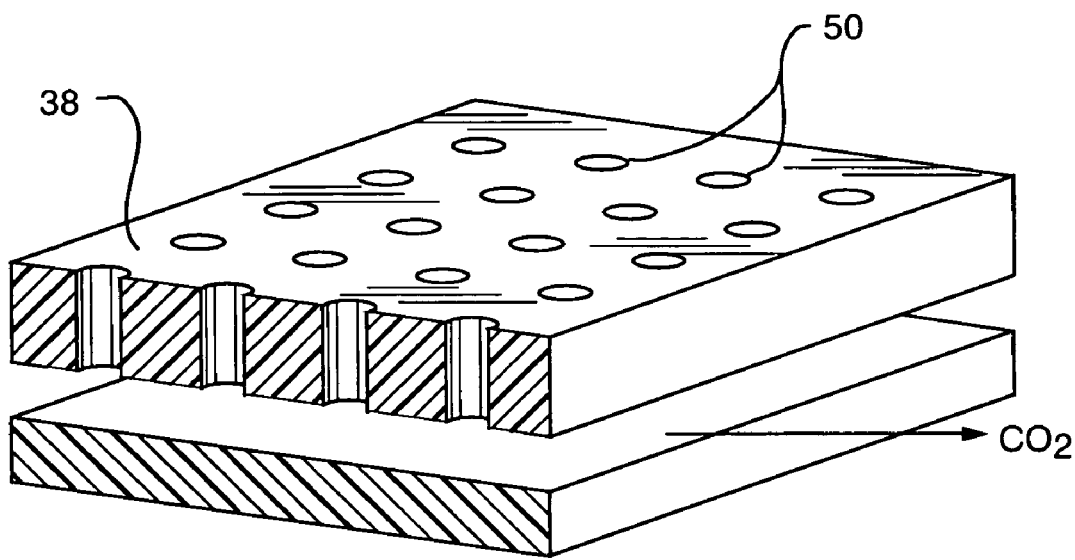
FIG. 5 is an isometric illustration of another embodiment of the diffusion layer of the present invention that includes perforations for delivery of the fuel mixture to the catalyzed membrane of the fuel cell.

In accordance with another aspect of the invention, fuel is delivered and directed to the catalyzed anode aspect of the MEA via dedicated features in the diffusion layer 8. More specifically, the diffusion layer 8, as illustrated in FIG. 5, is fabricated with perforations, such as the perforations 50 of FIG. 5. The perforations are typically pores with a diameter ranging from 0.01 µ to 100 µ. However, it is within the scope of the invention that the perforations may take other geometric shapes, and need not all be of the same shape. The perforations 50 may be formed by microperforation, vacuum deposition, chemical vapor deposition onto the porous layer, or by using other methods known to those skilled in the art. The body 38 of the diffusion layer 8, in accordance with this aspect of the invention, is also preferably substantially gas-impermeable yet permeable to the fuel mixture.

Figure 6:
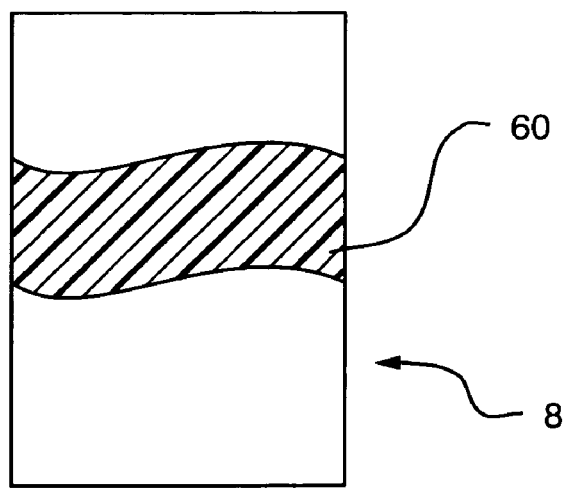
FIG. 6 is a side section of a diffusion layer of the present invention, which includes pores that are polymer filled.

When it is desired to deploy a thicker diffusion layer, then the openings in the diffusion layer 8, used for fuel delivery can be formed as narrow capillaries bored through the diffusion layer, rather than perforations. This aspect of the invention is illustrated in FIG. 6. The anode diffusion layer 8 includes capillaries 60. The capillaries 60 are preferably filled with a gas impermeable, liquid permeable substance. For example, the capillaries can be filled with a substance, such as recast Nafion, which is permeable to the fuel mixture, but not to anodically generated gasses, to allow the fuel mixture to be introduced to the anode aspect of the PCM, and it resists the diffusion of anodically generated gasses through the diffusion layer. This encourages delivery of the fuel to the MEA, while discouraging $CO_2$ travelling back towards the anode chamber. In accordance with the invention, the carbon dioxide instead can be removed and directed to the outer edges of the membrane 7 using either the conduits of the embodiments illustrated in FIGS. 3A and 3B, or the channels of the embodiments illustrated in FIGS. 4A and 4B.

In accordance with the method of the present invention, a diffusion layer can be fabricated by selecting a porous, electronically-conducting material such as a porous carbon composite material, or a treated carbon or treated carbon cloth, or combinations thereof. Thereafter, perforations such as pores or other openings 50 are created within the diffusion layer and those perforations would preferably have a width ranging form 0.01 µ to 100 µ. The openings can be created by microperforation, vacuum deposition, chemical vapor deposition of the porous layer or by using other methods known to those skilled in the art. To further enhance the gas-impermeability of the diffusion layer, the layer can be formed containing narrow capillaries that are filled with recast Nafion. In accordance with another aspect of the method of the invention, Nafion can be coextruded with or bonded with the diffusion layer to fill the capillaries. The solid recast Nafion polymer electrolyte material in the capillaries resists gas transport, yet allows water and fuel to diffuse to the catalyzed membrane surface, thus imparting the desired characteristics to the diffusion layer.

The invention further provides self-regulating fuel delivery to the catalyzed PCM because Nafion's diffusion coefficient increases with temperature, thus allowing a greater amount of the fuel mixture to pass to the catalyzed anode aspect of the PCM as cell power output rises. This effect is due to the typically increased operating temperature of a fuel cell system as power output of the fuel cell system increases. As such, additional fuel will be delivered to the catalyzed membrane, as power output increases.

Thus, what is produced is an improved diffusion layer that allows for a fuel to be delivered to the anode aspect of a catalyzed membrane surface of the PCM 7 while preventing, or substantially resisting the flow of carbon dioxide through the diffusion layer back into the fuel chamber 19. The improved diffusion layer operates without the need for active control of a fuel delivery system because the delivery of the fuel mixture is driven by the consumption of fuel at the anode aspect of the catalyzed membrane.

In accordance with the invention, it is possible that anodically generated $CO_2$ gas can be vented directly out of the fuel cell without using a separate $CO_2$ gas separator. However, a liquid/gas separator (also referred to herein as a "phase separator") may still be employed, if desired, to remove any residual $CO_2$ from the anode chamber. In that event, a $CO_2$ separator, such as a porous Teflon membrane, may be incorporated into the fuel cell. The phase separator may instead be located directly within the anode chamber, as described in commonly owned U.S. patent application Ser. No. 10/078,601 filed Feb. 19, 2002, for a SIMPLIFIED DIRECT OXIDATION FUEL CELL SYSTEM. However, it is preferable to minimize or eliminate the volume of carbon dioxide that passes through the diffusion layer, to minimize the volume of carbon dioxide that enters the chamber 19.

Figure 7:
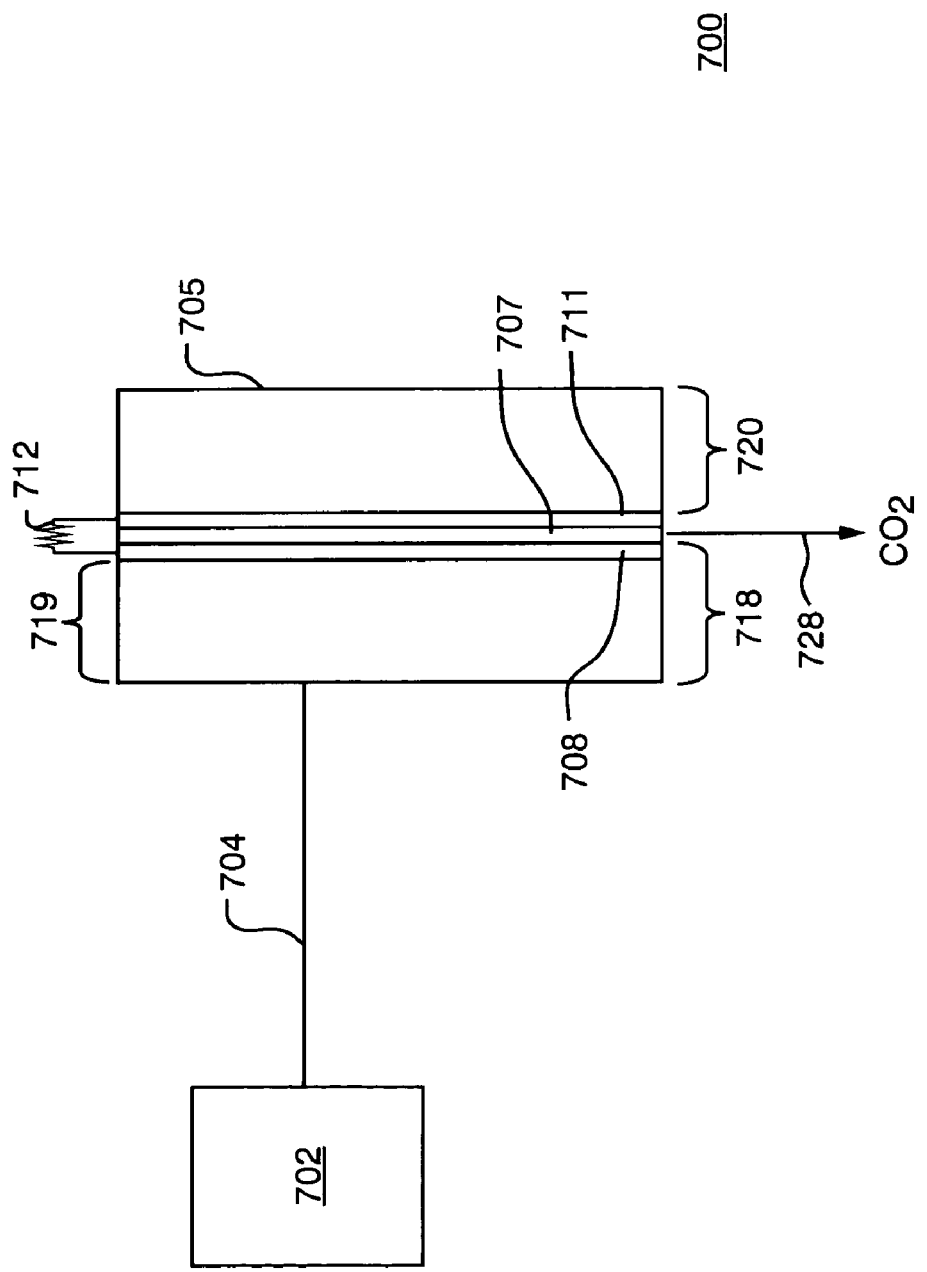
FIG. 7 shows an alternative fuel cell system architecture enabled by the present invention.

By implementing the inventive anode diffusion layer, a much simpler fuel cell, system, with a less complex carbon dioxide management scheme, such as that shown in FIG. 7, can be provided. System 700, is comprised of a fuel source 702, preferably comprised of a cartridge that contains a fuel, a fuel conduit 704, a fuel cell 705, and an electrical circuit connected between the anode and cathode as set forth within this application. It may be desirable to utilize a pump or internal reservoir (not shown) between fuel source 702 and fuel cell 705 and in communication with conduit 704. Fuel from fuel source 702, is then delivered to the fuel chamber 719, and is introduced to the inventive diffusion layer 708 and the catalyzed membrane electrolyte 707 while oxygen is introduced to the cathode diffusion layer 711 and the cathode aspect of the catalyzed membrane electrolyte 707 via the cathode chamber 720. Upon completion of the circuit 712 the electricity generating reactions common to direct methanol fuel cell systems occur, and current passes through the circuit 712.

In this simple system, anodically generated carbon dioxide is removed from the system by the diffusion layer 708 via a carbon dioxide vent 728 which provided by the inventive diffusion layer 708. Though shown as exiting the fuel cell system, carbon dioxide may be utilized to perform mechanical work within the system. As such, the system is greatly simplified by providing a simple effective means by which effluent gasses are managed.

It should be understood that the present invention provides a diffusion layer that can both deliver a carbonaceous fuel mixture to the anode membrane of a direct oxidation fuel cell while directing anodically generated carbon dioxide away from the anode aspect of the catalyzed membrane and away from the fuel chamber. The anodically-generated carbon dioxide can be used to perform work within the system or be ported to the ambient environment. While typical direct oxidation fuel cell systems require that a $CO_2$ separator be used to separate from the anode fuel mixture, the present invention eliminates the need to have a separate $CO_2$ separator by allowing $CO_2$ to be released without it being routed through the fuel solution. By allowing the fuel mixture to diffuse through the inventive delivery mechanism, orientation independence is also achieved, allowing for a less complex system. In addition, with the need for a $CO_2$ gas separator being eliminated, components are eliminated, reducing the complexity and volume of the system.

The foregoing description has been directed to specific embodiments of the invention. It will be apparent however, that other variations and modifications may be made to the described embodiments with the attainment of some or all of advantages of such. Therefore, it is the object of the appended claims to cover all such variations and modifications as come within the true spirit and scope of the invention.

What is claimed is:

1. An anode diffusion layer for a direct oxidation fuel cell comprising
    a multi-layered component having a first layer including at least one channel disposed on an outer aspect of said layer adjacent said anode face of the catalyzed membrane, said channel providing a preferential flow path for carbon dioxide generated in an anodic reaction away from the catalyzed membrane and away from an anode chamber containing the carbonaceous fuel supply in the fuel cell, and a second layer providing preferential flow path to cause liquid fuel to travel in a predetermined direction towards the anode face of the catalyzed membrane of the fuel cell.

2. The anode diffusion layer for a direct oxidation fuel cell as defined in claim 1 wherein said layer includes a plurality of parallel channels formed therein that direct carbon dioxide to outer edges of the fuel cell away from an anode fuel chamber in the fuel cell.

3. The anode diffusion layer for a direct oxidation fuel cell as defined in claim 1 wherein,
    said second layer has capillaries bored through the layer providing preferential flow paths to cause liquid fuel to travel in a predetermined direction towards the anode face of the catalyzed membrane electrolyte of the fuel cell.

4. The anode diffusion layer for a direct oxidation fuel cell as defined in claim 3 wherein at least a portion of said capillaries are substantially filled with a recast polyperfluorosulfonic acid solution substantially comprising polyperfluorosulfonic acid and ion-exchange polymers.

5. The anode diffusion layer for a direct oxidation fuel cell as defined in claim 4 wherein said capillaries are substantially filled with a recast polyperfluorosulfonic acid that forms a solid recast polyperfluorosulfonic acid polymer electrolyte material that substantially resists gas transport through the diffusion layer yet allows a carbonaceous, aqueous fuel mixture to diffuse therethrough to said catalyzed membrane.

6. An anode diffusion layer for a direct oxidation fuel cell, the fuel cell having a catalyzed membrane including an anode face, the diffusion layer comprising:
    a multi-layered component disposed generally adjacent to the anode face of the catalyzed membrane, said component having a first layer including at least one conduit therein disposed generally in a geometric plane parallel to a plane of the anode face of the catalyzed membrane, said conduit providing a preferential flow path for carbon dioxide generated in an anodic reaction to direct the carbon dioxide away from the catalyzed membrane and away from an anode chamber containing the carbonaceous fuel supply in the fuel cell, and a second layer being substantially comprised of a liquid permeable material through which fuel diffuses from said anode chamber to said catalyzed membrane.

7. The anode diffusion layer for a direct oxidation fuel cell as defined in claim 6 wherein said layer includes a plurality of parallel conduits formed therein that direct carbon dioxide to outer edges of the fuel cell away from an anode fuel chamber in the fuel cell.

8. The anode diffusion layer for a direct oxidation fuel cell as defined in claim 7 wherein said diffusion layer is a multi-layered component including:
    (A) a first portion that is comprised substantially of a gas permeable material that allows said carbon dioxide to diffuse through to said conduit; and
    (B) a second portion disposed generally aft of said conduits, that is substantially comprised of a liquid permeable material that allows fuel to diffuse from said anode chamber to said catalyzed membrane whereby carbon dioxide is encouraged to flow into said conduits and away from said catalyzed membrane.

9. The anode diffusion layer for a direct oxidation fuel cell as defined in claim 8 wherein an interior shape of at least a portion of said plurality of conduits is non-cylindrical.

10. An anode diffusion layer for a direct oxidation fuel cell, the fuel cell having a catalyzed membrane including an anode face, the diffusion layer comprising:
    a layer disposed generally adjacent to the anode face of the catalyzed membrane, said layer having at least one channel formed as an indentation in an aspect thereof that is adjacent the anode face of the catalyzed membrane, said channel providing a preferential flow path for carbon dioxide generated in an anodic reaction to direct the carbon dioxide away from the catalyzed membrane and away from an anode chamber containing the carbonaceous fuel supply in the fuel cell.

11. The anode diffusion layer for a direct oxidation fuel cell as defined in claim 10 wherein said layer includes a plurality of parallel channels formed therein that direct carbon dioxide to outer edges of the fuel cell away from an anode fuel chamber in the fuel cell.

12. The anode diffusion layer for a direct oxidation fuel cell as defined in claim 11 wherein each of said plurality of parallel channels is coated on an interior wall with a gas impermeable substance.

13. The anode diffusion layer for a direct oxidation fuel cell as defined in claim 12 wherein each of said plurality of parallel channels form a pattern on an outer surface of the diffusion layer adjacent the anode face of the catalyzed membrane.

* * * * *